US012307764B2

United States Patent
Beller et al.

(10) Patent No.: US 12,307,764 B2
(45) Date of Patent: May 20, 2025

(54) AUGMENTED REALITY TRANSLATION OF SIGN LANGUAGE CLASSIFIER CONSTRUCTIONS

(71) Applicant: INTERNATIONAL BUSINESS MACHINES CORPORATION, Armonk, NY (US)

(72) Inventors: Charles E. Beller, Baltimore, MD (US); Zachary A. Silverstein, Austin, TX (US); Jeremy R. Fox, Georgetown, TX (US); Clement Decrop, Arlington, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 476 days.

(21) Appl. No.: 17/303,313

(22) Filed: May 26, 2021

(65) Prior Publication Data

US 2022/0383025 A1 Dec. 1, 2022

(51) Int. Cl.
*G06V 20/20* (2022.01)
*G06T 11/00* (2006.01)
*G06T 13/00* (2011.01)
*G06V 40/20* (2022.01)

(52) U.S. Cl.
CPC .............. *G06V 20/20* (2022.01); *G06T 11/00* (2013.01); *G06T 13/00* (2013.01); *G06V 40/28* (2022.01)

(58) Field of Classification Search
CPC ........ G06V 20/20; G06V 40/28; G06F 18/21; G06F 18/2431; G06T 11/00; G06T 13/00
See application file for complete search history.

(56) References Cited

U.S. PATENT DOCUMENTS

| 8,140,339 | B2 | 3/2012 | Hernandez-Rebollar |
| 8,411,824 | B2 | 4/2013 | Bucchieri |
| 9,183,580 | B2* | 11/2015 | Rhoads ............. H04M 1/72403 |
| 11,036,987 | B1* | 6/2021 | Bramwell ............... G06T 19/20 |
| 2010/0063794 | A1 | 3/2010 | Hernandez-Rebollar |
| 2014/0310595 | A1* | 10/2014 | Acharya ................. G06F 3/011 715/706 |

(Continued)

OTHER PUBLICATIONS

American Sign Language University, "ASL Classifiers Level 1," Lifeprint.com, [accessed on Jan. 25, 2021], 25 pages, Retrieved from the Internet: <URL: http://www.lifeprint.com/asl101//pages-signs/classifiers/classifiers-main.htm>.

(Continued)

*Primary Examiner* — Shaghayegh Azima
(74) *Attorney, Agent, or Firm* — Steven M. Bouknight (57) ABSTRACT

A method, computer system, and a computer program product for translating a classifier construction into a graphical representation is provided. The present invention may include observing a classifier handshape by an augmented reality device. The present invention may include analyzing the observed classifier handshape according to an object recognition algorithm to determine a contextual meaning of the classifier handshape. The present invention may include converting the contextual meaning of the observed classifier handshape into a graphical representation. The present invention may include displaying the graphical representation alongside the observed classifier handshape on the augmented reality device.

20 Claims, 5 Drawing Sheets

(56) References Cited

U.S. PATENT DOCUMENTS

| | | | | |
|---|---|---|---|---|
| 2014/0357312 A1* | 12/2014 | Davis | .................... | H04N 23/70 |
| | | | | 455/550.1 |
| 2016/0014297 A1 | 1/2016 | Aller | | |
| 2016/0042228 A1* | 2/2016 | Opalka | .................... | G06F 3/01 |
| | | | | 382/103 |
| 2018/0075659 A1* | 3/2018 | Browy | ............... | G02B 27/0172 |
| 2018/0293986 A1* | 10/2018 | Musham | ................. | G10L 15/26 |
| 2019/0138607 A1* | 5/2019 | Zhang | ................... | G06N 3/044 |
| 2020/0334452 A1* | 10/2020 | Gurbuz | ................... | G01S 7/354 |
| 2021/0160709 A1* | 5/2021 | Marumo | ............... | H04W 24/02 |
| 2023/0253104 A1* | 8/2023 | Serruya | ................. | A61B 5/369 |
| | | | | 623/25 |

OTHER PUBLICATIONS

Coviu, "How we used AI to translate sign language in real time," Medium.com, Sep. 20, 2018, 7 pages, <URL: https://medium.com/@coviu/how-we-used-ai-to-translate-sign-language-in-real-time-782238ed6bf>.

Disclosed Anonymously, "Novel System for Teaching Deaf Community Through Hand Sign to Pictograph Conversion," IP.com Prior Art Database Technical Disclosure, IP.com No. IPCOM000263906D, Oct. 19, 2020, 3 pages.

Fang, et al., "DeepASL: Enabling Ubiquitous and Non-Intrusive Word and Sentence-Level Sign Language Translation," SenSys '17: Proceedings of the 15th ACM Conference on Embedded Network Sensor Systems, Nov. 6-8, 2017, 13 pages, <URL: https://doi.org/10.1145/3131672.3131693>.

Mell et al., "The NIST Definition of Cloud Computing," National Institute of Standards and Technology, Special Publication 800-145, Sep. 2011, pp. 1-7.

Rivas, et al., "Intelligent System for the Learning of Sign Language Based on Artificial Neural Networks," Springer Nature Switzerland AG 2019, pp. 310-318, <URL: https://link.springer.com/chapter/10.1007%2F978-3-030-25999-0_27>.

Saggio, et al., "Sign Language Recognition Using Wearable Electronics: Implementing k-Nearest Neighbors with Dynamic Time Warping and Convolutional Neural Network Algorithms," Sensors, Jul. 11, 2020, 14 pages, <URL: https://www.mdpi.com/1424-8220/20/14/3879>.

Wikipedia, "Classifier Constructions in Sign Languages," Wikipedia, [accessed on Jan. 25, 2021], 13 pages, Retrieved from the Internet: < URL: https://en.wikipedia.org/wiki/Classifier_constructions_in_sign_languages>.

* cited by examiner

AUGMENTED REALITY TRANSLATION OF SIGN LANGUAGE CLASSIFIER CONSTRUCTIONS

BACKGROUND

The present invention relates generally to the field of computing, and more particularly to natural language processing.

Sign languages, including American Sign Language (ASL), among others, may incorporate a rich gesture-based description of verbs of motion (i.e., classifier constructions). Classifier constructions may convey detailed information about a relative position and a path of an object moving through space. Such detailed information may typically be difficult to accurately translate into spoken languages (e.g., English) as some of the information relating to path and position may be lost.

SUMMARY

Embodiments of the present invention disclose a method, computer system, and a computer program product for translating a classifier construction into a graphical representation. The present invention may include observing a classifier handshape by an augmented reality device. The present invention may include analyzing the observed classifier handshape according to an object recognition algorithm to determine a contextual meaning of the classifier handshape. The present invention may include converting the contextual meaning of the observed classifier handshape into a graphical representation. The present invention may include displaying the graphical representation alongside the observed classifier handshape on the augmented reality device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for translating a classifier construction into a graphical representation. As such, the present embodiment has the capacity to improve the technical field of natural language processing by translating classifier constructions of sign language hand signals to image and/or video imagery representative of the observed hand signals and to, at a minimum, overlay the image and/or video imagery on an existing video feed (e.g., as in augmented reality). More specifically, the present invention may include observing a classifier handshape by an augmented reality device. The present invention may include analyzing the observed classifier handshape according to an object recognition algorithm to determine a contextual meaning of the classifier handshape. The present invention may include converting the contextual meaning of the observed classifier handshape into a graphical representation. The present invention may include displaying the graphical representation alongside the observed classifier handshape on the augmented reality device.

As described previously, sign languages, including American Sign Language (ASL), among others, may incorporate a rich gesture-based description of verbs of motion (i.e., classifier constructions). Classifier constructions may convey detailed information about a relative position and a path of an object moving through space. Such detailed information may typically be difficult to accurately translate into spoken languages (e.g., English) as some of the information relating to path, position, and/or manner of movement, among other things, may be lost.

Therefore, it may be advantageous to, among other things, utilize an augmented reality (AR) device to convey the highly detailed information in classifier constructions to non-signers.

According to at least one embodiment, the present invention may ingest sign language (e.g., American Sign Language (ASL)) hand signals and may convey a contextual meaning by means of graphical representation.

According to at least one embodiment, the present invention may further produce a moving graphic (e.g., a Graphics Interchange Forms (GIF) and/or a video, among other things) exhibiting a classifier handshape's mirrored movement. A classifier handshape's mirrored movement may be intended to convey an icon and/or an image performing an analog to a movement of a signer's hand. A classifier handshape's mirrored movement may be akin to a brief animated vignette whereby different icon(s) may be chosen based on a classifier construction. There may be a finite number of classifier constructions, and an ASL speaker may know what is being referred to based on a context of the conversation. Based on the determined classifier construction, an icon may be selected to be displayed in the AR device alongside the signer's classifier handshapes.

According to at least one embodiment, the present invention may further utilize a recurrent neural network (RNN) and/or a convolutional neural network (CNN) trained using the shapes of the hand signals (i.e., signs, hand signs) to select a proper meaning of the signer's hand signals from a connected corpus (e.g., a database). The corpus may be a corpus of labeled sign videos and/or images. The corpus may include video depicting hand signals (i.e., signs, hand signs) for a signer as well as an English transcription of the video for a non-signer. Videos included in the corpus may include classifier constructions in order for the present invention to provide details regarding a path of movement and/or a manner of movement (e.g., in order for there to be a translation of a classifier construction depicted within an augmented reality device). A video included in the corpus which does not include classifier constructions may still function with the present invention, with the translation including less detail pertaining to movement (e.g., the augmented reality device may populate a still image as opposed to an animated video).

According to at least one embodiment, the present invention may further utilize an RNN and/or a CNN trained using handshapes (i.e., classifier handshapes) to select a proper meaning of the signer's handshapes (i.e., classifier handshapes) from a connected corpus (e.g., a database).

According to at least one embodiment, the present invention may enable a user to provide stylizations, preferences, and/or other content modification(s) based on the user's preferred corpus.

According to at least one embodiment, the present invention may enable a user to select a preferred rendering of the user's hand sign. A rendering may be a generating of an image and/or icon based on a signer's (i.e., a user's) hand sign. A preferred rendering may be selected by the user from a library of options provided by the classifier constructions program (e.g., if the library of options provides for ten cars to choose from, then the user may select a best fit for what is meant by the classifier construction based on a context of the conversation). A preferred rendering of the user's hand sign may be selected when the generating of an image and/or icon is not performed in real time but is performed offline. The preferred rendering may be a default selection in instances where the generating of the image and/or icon is performed in real time.

According to at least one embodiment, the present invention may display multiple context(s) and/or visual content if the translation module is unsure of the exact meaning of the signer's hand signals and/or where multiple signs for a meaning are understood and rendered. The context(s) and/or visual content may be gathered from a corpus of hand signal meanings and may be identified using the RNN and/or CNN.

According to at least one embodiment, the present invention may translate classifier constructions of sign language hand signals to image and/or video imagery representative of the observed hand signals. The video imagery may be generated as an animated Graphics Interchange Forms (GIF) and/or a similar image file format which may be sent over a chat interface. The GIF and/or similar image file format may be overlayed on an existing video feed (e.g., as in augmented reality) and/or projected into an isolated three-dimensional (3D) environment (e.g., as in virtual reality).

Figure 1:
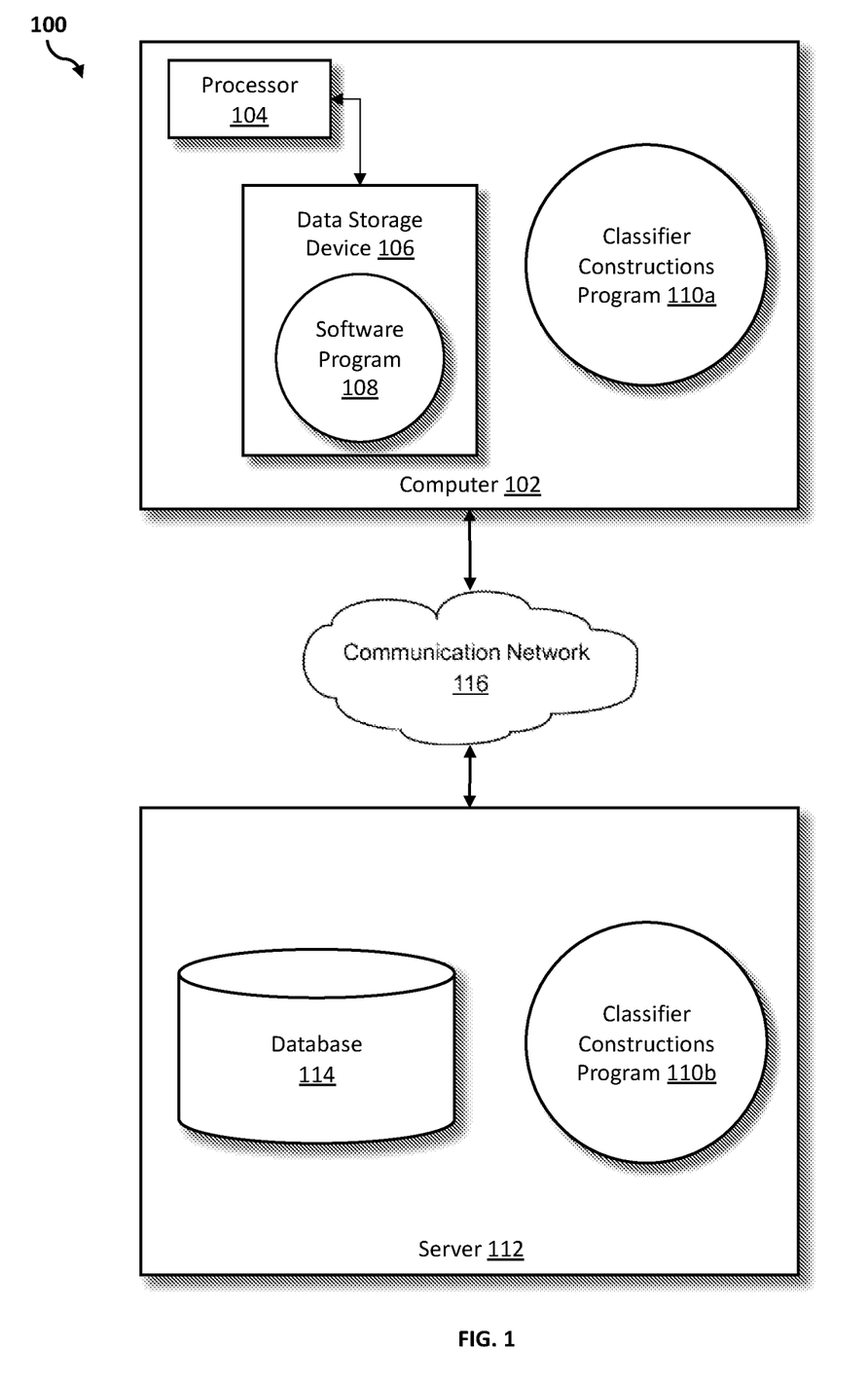
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a classifier constructions program 110a. The networked computer environment 100 may also include a server 112 that is enabled to run a classifier constructions program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the classifier constructions program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the classifier constructions program 110a, 110b (respectively) to translate classifier constructions of sign language hand signals to image and/or video imagery representative of the observed hand signals and to, at a minimum, overlay the image and/or video imagery on an existing video feed (e.g., as in augmented reality). The classifier constructions method is explained in more detail below with respect to FIG. 2.

Figure 2:
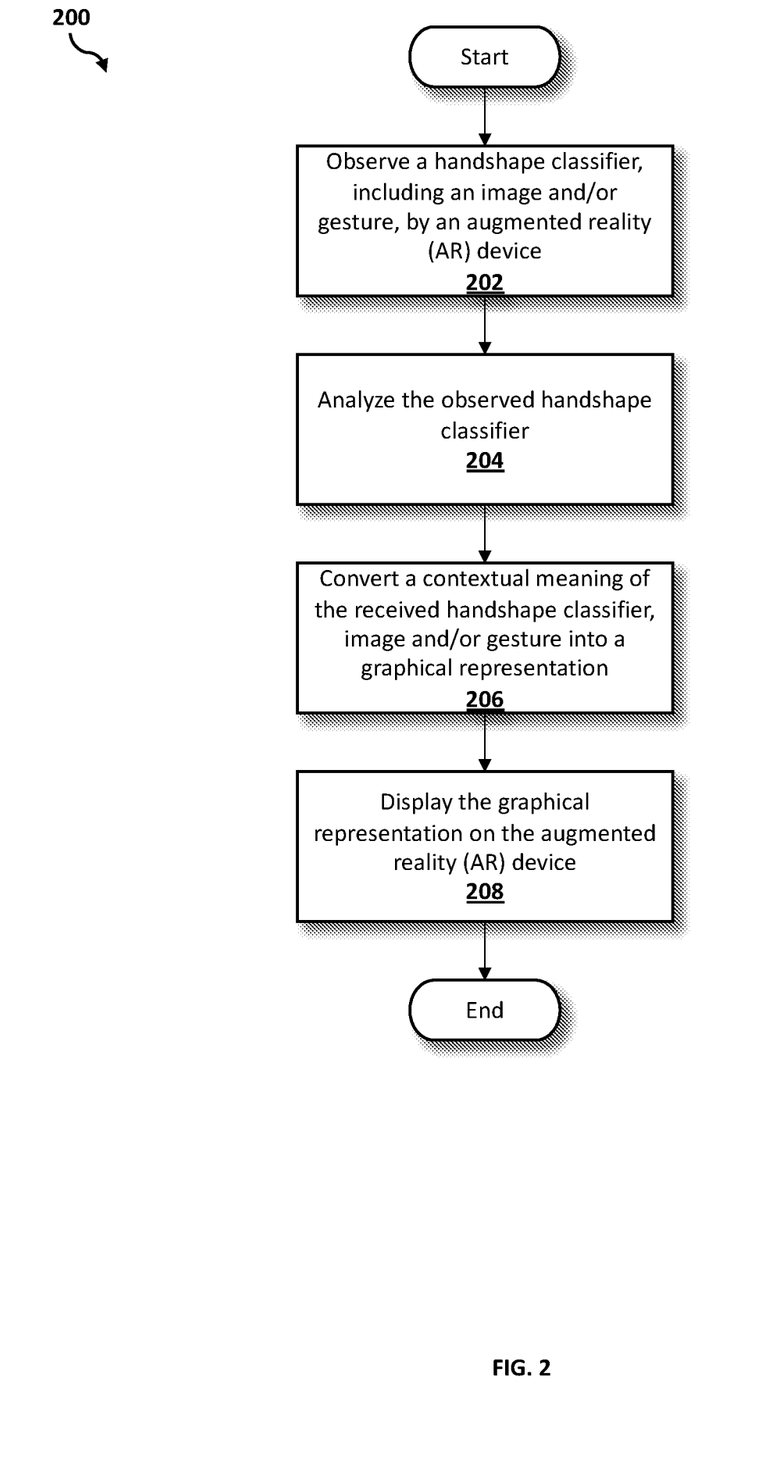
FIG. 2 is an operational flowchart illustrating a process for translating a classifier construction into a graphical representation according to at least one embodiment.

Referring now to FIG. 2, an operational flowchart illustrating the exemplary classifier constructions process 200 used by the classifier constructions program 110a and 110b according to at least one embodiment is depicted.

At 202, a classifier handshape is observed by an augmented reality (AR) device. A classifier handshape may be observed in an image and/or gesture performed by a signer (e.g., an individual performing sign language) and observed by the augmented reality (AR) device.

A user may opt-in to the classifier constructions program 110a, 110b which may be comprised of at least one module, including but not limited to a translation module used for translating detailed information in classifier constructions to non-signers. A classifier construction may be used to express events and/or states using classifier handshapes (i.e., hand signals, signs, hand signs, handshapes) which represent movement, location and/or shape. The translation module may utilize an augmented reality device to observe at least one hand sign by capturing a signed conversation over video and storing the signed conversation locally on the augmented reality (AR) device, or using a cloud storage service, among other things.

At 204, an observed classifier handshape is analyzed.

Classifier constructions observed by the augmented reality (AR) device at 202 may be in the form of gestures such as sign language (e.g., American Sign Language (ASL)) hand signals. A classifier construction may refer to a morphological system that may express events and states, which system may use classifier handshapes to represent movement, location, and shape. In a classifier construction system, a handshape, a location, and/or a movement may all have a particular meaning.

The classifier constructions program 110*a*, 110*b* may identify at least one handshape (i.e., classifier handshape) in the received images and/or gestures observed by the augmented reality (AR) device. Classifier constructions may involve a single handshape being moved to convey an analog iconic motion. Classifier constructions may also involve a second handshape which may be used to convey a particular motion (e.g., in order to convey a car crashing into a wall, a first hand may be used to convey the car and a second hand may be used to convey the wall).

An object detection algorithm such as a convolutional neural network (CNN) performing object detection in real time (e.g., by applying a single neural network to a full image and then dividing the image into regions and predicting bounding boxes and probabilities for each divided region), among other object detection algorithms, may be utilized to perform object detection of a signer's hands (e.g., of a received gesture an).

Once the object detection algorithm detects the signer's hands (e.g., the received gesture), an object recognition algorithm may be utilized to identify and label the signer's hands (e.g., the received gesture).

Analyzing the received gesture(s) may be done according to an object recognition algorithm utilizing a corpus to determine a contextual meaning of the received gestures.

The object recognition algorithm may be a neural network (e.g., a convolutional neural network) and/or a multi-class classifier capable of recognizing underlying relationships in a set of data. The object recognition algorithm may be trained to associate a received video and/or a still image with an associated word and to output a label (i.e., the word) representing the viewed hand signal in an augmented reality (AR) device. The corpus may include videos and/or images of signing done by many users in many scenarios and/or environments (e.g., indoors and/or outdoors, among other scenarios and/or environments). The videos and/or images included in the corpus may be coupled with an associated word depicting what the video and/or image represents. The object recognition algorithm may also be taught where in a video and/or an image a signer's hands may be located.

At 206, a contextual meaning of a received hand sign, image and/or gesture is converted into a graphical representation.

The classifier constructions program 110*a*, 110*b* may index and identify at least one observed sign in the received gestures. The classifier constructions program 110*a*, 110*b* may use the identified handshape (i.e., classifier handshape) (as described previously with respect to step 204 above) in conjunction with a determined conversational context (e.g., determined based on the use of a CNN and/or RNN model) to generate a static and/or video image analog of the observed handshape (as will be described in more detail with respect to step 208 below). The conversational context may be determined based on a preceding conversation (e.g., a conversation which may have occurred earlier in time than the classifier construction and which may provide basic information relating to what the classifier construction may represent). The preceding conversation may be used to resolve any ambiguity of the observed handshape.

For example, a handshape reserved for "vehicles" may not distinguish between a car, a bus, or a tractor. The determined conversational context may resolve which of the above is being referenced (e.g., using conversational clues such as "hay," "horse," and/or "grass," among other things).

Using the identified handshape (i.e., classifier handshape) (as described previously with respect to step 204 above), the classifier constructions program 110*a*, 110*b* may identify the most likely compatible antecedent of the classifier construction based on a preceding portion of the conversation (e.g., the use of the word "tractor") and may select an image and/or video imagery from an image library (i.e., a corpus, a repository) reflecting the compatible antecedent. The image and/or video imagery may be retrieved from a repository using an RNN and/or a CNN model trained against a corpus. For example, the CNN and/or RNN model may determine a corresponding image based on the image and/or video imagery.

The image library (i.e., the corpus, the repository) may include approved Graphics Interchange Forms (GIF) files, video files, and/or static photos.

According to at least one embodiment, there may be a direct mapping from a handshape (i.e., a classifier handshape) to an image (e.g., there may be a default image based on an observed handshape).

According to at least one embodiment, there may be a direct mapping from a handshape (i.e., a classifier handshape) to a term in a searchable indexed repository. When a term is identified, an image may be automatically retrieved.

In some instances, the conversation may specify additional adjectival modifiers of a word (e.g., "big tractor," "red tractor") which may be used to modify a generated image (as will be described in more detail with respect to step 208 below) with parameters which match the context of the conversation (e.g., instructions to color the tractor image red and/or to enlarge the tractor from a default size). The classifier constructions program 110*a*, 110*b* may automatically make modifications to a generated image based on the conversational context. Alternatively, and/or additionally, a chat interface may be implemented to determine necessary modifications (e.g., received as user input from a user of the classifier constructions program 110*a*, 110*b*.

At 208, the graphical representation of the contextual meaning of the received hand sign, image and/or gesture is displayed on the augmented reality (AR) device.

A meaning of the at least one observed sign is superimposed over the hand motion(s) which generated the meaning. This may be done by drawing a corresponding image (e.g., the graphical representation described previously with respect to step 206 above) within the augmented reality (AR) device. For example, the classifier constructions program 110*a*, 110*b* may utilize pixilation data from the handshape(s) (i.e., classifier handshape(s)) to determine their position(s) within a frame of the AR device.

The classifier constructions program 110*a*, 110*b* may trace the handshape(s) (i.e., classifier handshape(s)) movement and may superimpose a corresponding image within the frame of an observed handshape.

The classifier constructions program 110*a*, 110*b* may track a movement of a classifier handshape and may mirror that movement as movement of an analog image through space within a video image. For example, a signer's hand may be moving in front of the user and an image (e.g., the graphical representation described previously with respect to step 206 above) may be moving analogously with the signer's hand within an augmented reality (AR) device.

The classifier constructions program 110a, 110b may alternatively or additionally identify additional stylistic content based on the observed handshapes (i.e., classifier handshape) and may add additional animations to the generated image and/or video imagery. This may include attempting to recognize non-manual markers (e.g., if an excessive speed of movement is detected then the generated image and/or video imagery may be augmented and additional "speed lines" may be added).

An output of the classifier constructions program 110a, 110b may thus be a rendering of a dynamic animation which may be overlaid within the augmented reality (AR) device in real time and which may guide the user through an enhancement of, for example, the American Sign Language (ASL).

It may be appreciated that FIG. 2 provides only an illustration of one embodiment and do not imply any limitations with regard to how different embodiments may be implemented.

Many modifications to the depicted embodiment(s) may be made based on design and implementation requirements.

Figure 3:
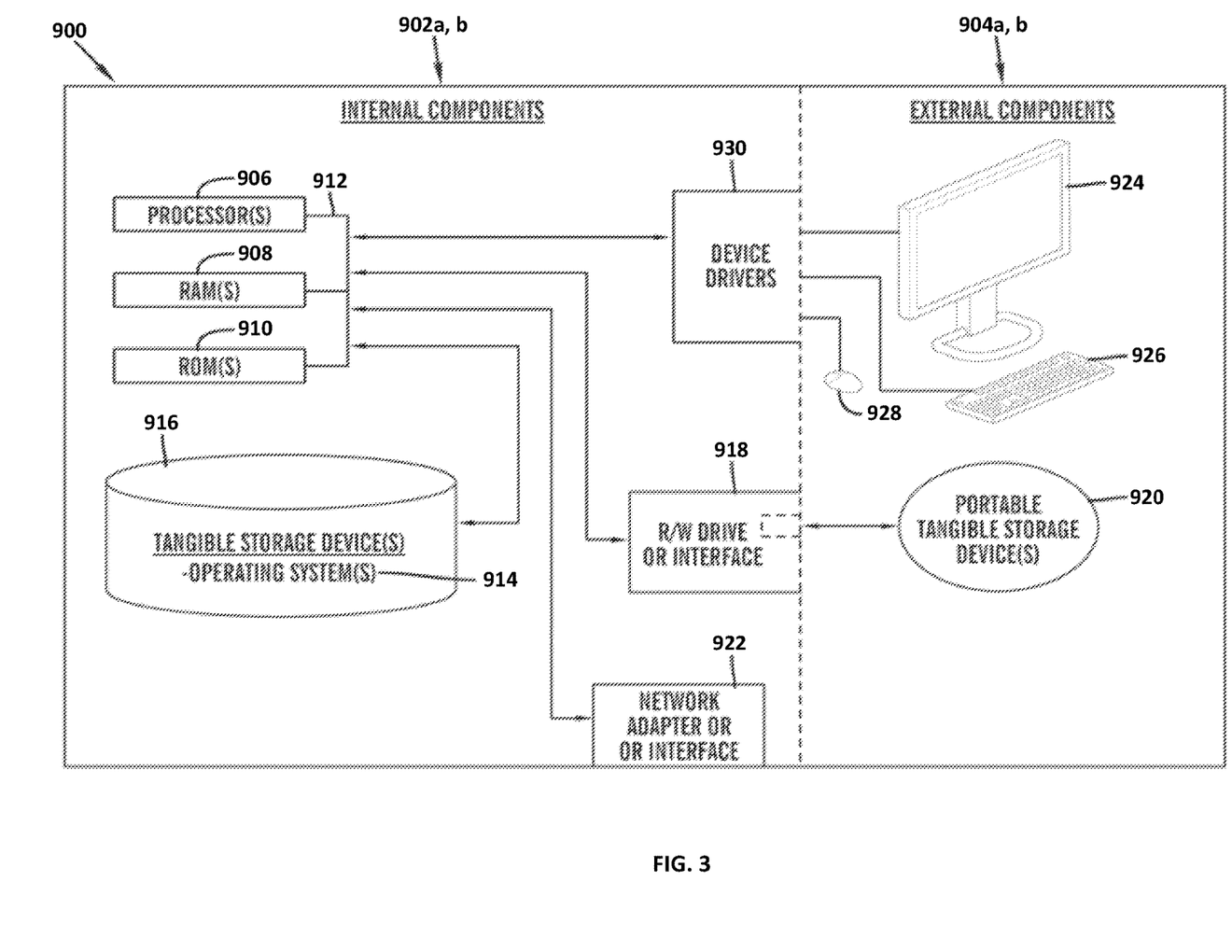
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 3. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the classifier constructions program 110a in client computer 102, and the classifier constructions program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the classifier constructions program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the classifier constructions program 110a in client computer 102 and the classifier constructions program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the classifier constructions program 110a in client computer 102 and the classifier constructions program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
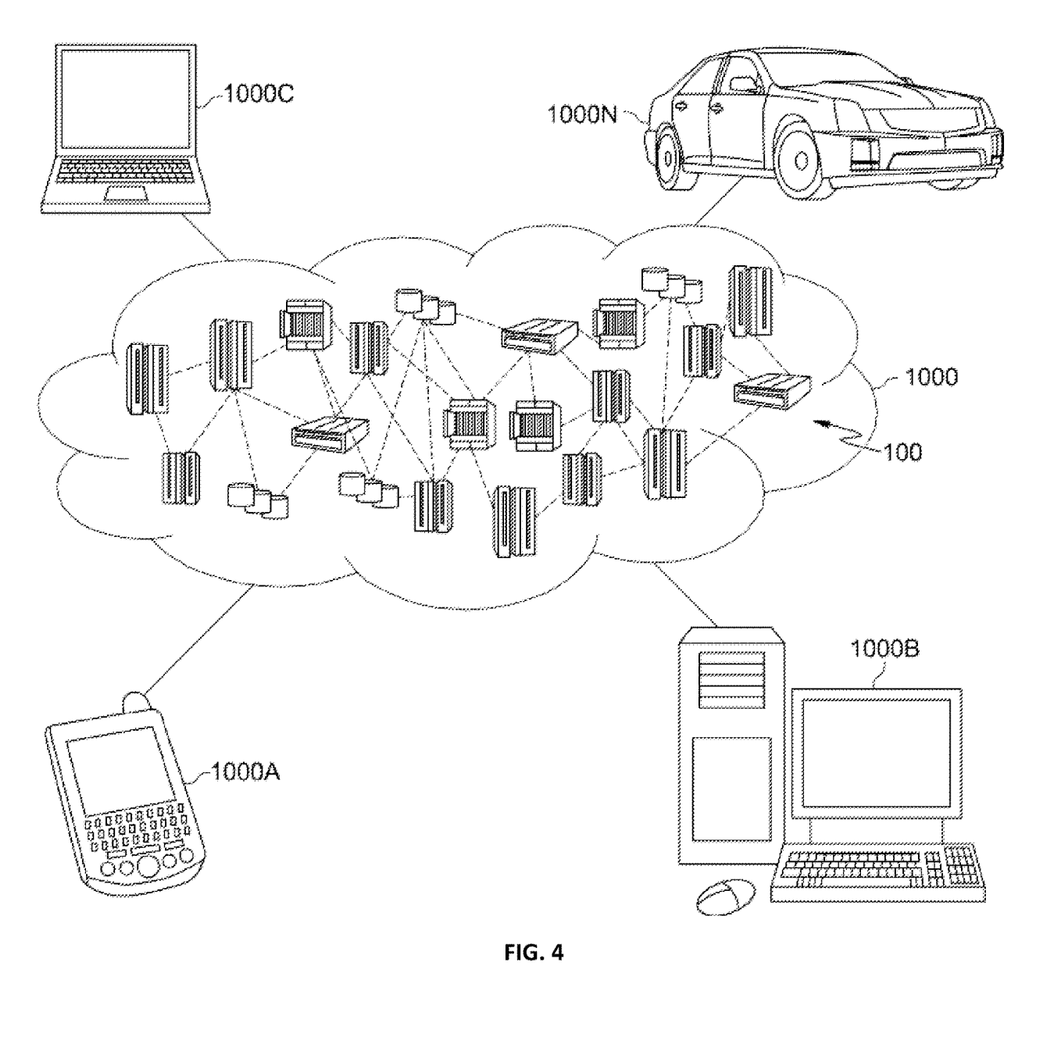
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
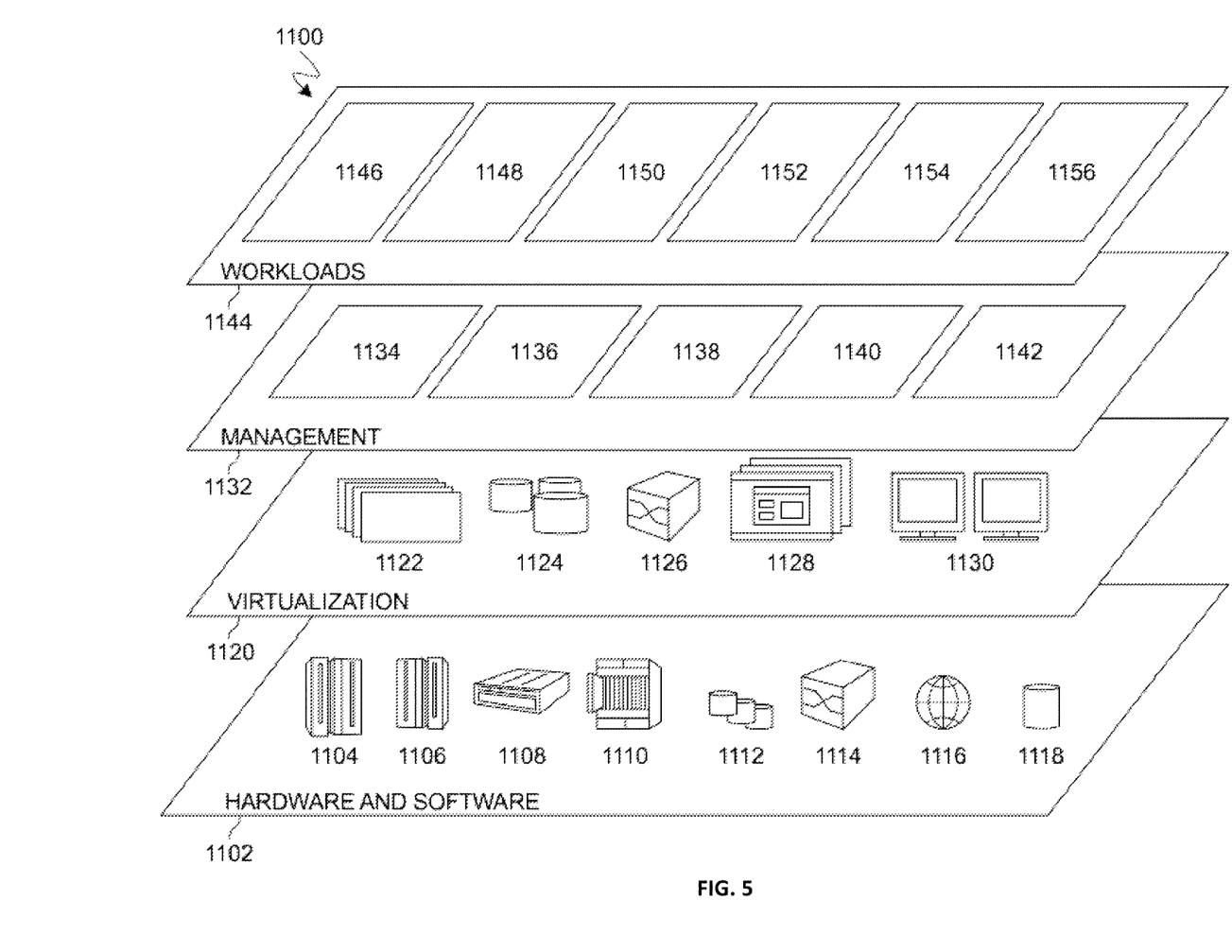
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and classifier constructions 1156. A classifier constructions program 110a, 110b provides a way to translate classifier constructions of sign language hand signals to image and/or video imagery representative of the observed hand signals and to, at a minimum, overlay the image and/or video imagery on an existing video feed (e.g., as in augmented reality).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for translating a classifier construction into a graphical representation, the method comprising:
    observing a classifier handshape by an augmented reality device;
    analyzing the observed classifier handshape according to an object recognition algorithm to determine a contextual meaning of the classifier handshape;
    converting the contextual meaning of the observed classifier handshape into a graphical representation, wherein converting the contextual meaning into the graphical representation further comprises retrieving a generated image or video imagery from a repository, and based on one or more additional adjectival modifiers of a term in a conversation and based on a context of the conversation associated with the observed classifier handshape, automatically modifying the generated image or video imagery with parameters matching the contextual meaning of the one or more additional adjectival modifiers from the conversation;
    displaying the graphical representation, wherein displaying the graphical representation further comprises, superimposing the graphical representation in the augmented reality device.

2. The method of claim 1, wherein the contextual meaning is based on the observed classifier handshape and a conversational context and is determined utilizing a connected corpus.

3. The method of claim 1, wherein the graphical representation is an animated Graphics Interchange Forms (GIF).

4. The method of claim 3, wherein the GIF is retrieved from a corpus by a neural network trained using a plurality of classifier handshapes.

5. The method of claim 1, wherein the observed classifier handshape is an American Sign Language (ASL) gesture.

6. The method of claim 1, wherein the object recognition algorithm is a multi-class classifier trained to associate a video and/or a still image with an associated word and to output a label.

7. The method of claim 1, wherein the graphical representation is overlayed on an existing video feed.

8. A computer system for translating a classifier construction into a graphical representation, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    observing a classifier handshape by an augmented reality device;
    analyzing the observed classifier handshape according to an object recognition algorithm to determine a contextual meaning of the classifier handshape;
    converting the contextual meaning of the observed classifier handshape into a graphical representation, wherein converting the contextual meaning into the graphical representation further comprises retrieving a generated image or video imagery from a repository, and based on one or more additional adjectival modifiers of a term in a conversation and based on a context of the conversation associated with the observed classifier handshape, automatically modifying the generated image or video imagery with parameters matching the contextual meaning of the one or more additional adjectival modifiers from the conversation;
    displaying the graphical representation, wherein displaying the graphical representation further comprises, superimposing the graphical representation in the augmented reality device.

9. The computer system of claim 8, wherein the contextual meaning is based on the observed classifier handshape and a conversational context and is determined utilizing a connected corpus.

10. The computer system of claim 8, wherein the graphical representation is an animated Graphics Interchange Forms (GIF).

11. The computer system of claim 10, wherein the GIF is retrieved from a corpus by a neural network trained using a plurality of classifier handshapes.

12. The computer system of claim 8, wherein the observed classifier handshape is an American Sign Language (ASL) gesture.

13. The computer system of claim 8, wherein the object recognition algorithm is a multi-class classifier trained to associate a video and/or a still image with an associated word and to output a label.

14. The computer system of claim 8, wherein the graphical representation is overlayed on an existing video feed.

15. A computer program product for translating a classifier construction into a graphical representation, comprising:
    one or more non-transitory computer-readable storage media and program instructions stored on at least one of the one or more tangible storage media, the program instructions executable by a processor to cause the processor to perform a method comprising:
    observing a classifier handshape by an augmented reality device;
    analyzing the observed classifier handshape according to an object recognition algorithm to determine a contextual meaning of the classifier handshape;
    converting the contextual meaning of the observed classifier handshape into a graphical representation, wherein converting the contextual meaning into the graphical representation further comprises retrieving a generated image or video imagery from a repository, and based on one or more additional adjectival modifiers of a term in a conversation and based on a context of the conversation associated with the observed classifier handshape, automatically modifying the generated image or video imagery with parameters matching the contextual meaning of the one or more additional adjectival modifiers from the conversation;

displaying the graphical representation, wherein displaying the graphical representation further comprises, superimposing the graphical representation in the augmented reality device.

16. The computer program product of claim 15, wherein the contextual meaning is based on the observed classifier handshape and a conversational context and is determined utilizing a connected corpus.

17. The computer program product of claim 15, wherein the graphical representation is an animated Graphics Interchange Forms (GIF).

18. The computer program product of claim 17, wherein the GIF is retrieved from a corpus by a neural network trained using a plurality of classifier handshapes.

19. The computer program product of claim 15, wherein the observed classifier handshape is an American Sign Language (ASL) gesture.

20. The computer program product of claim 15, wherein the object recognition algorithm is a multi-class classifier trained to associate a video and/or a still image with an associated word and to output a label.

* * * * *